G. E. TURNER.
SAW TOOL.
APPLICATION FILED OCT. 9, 1917.
1,272,153.
Patented July 9, 1918.
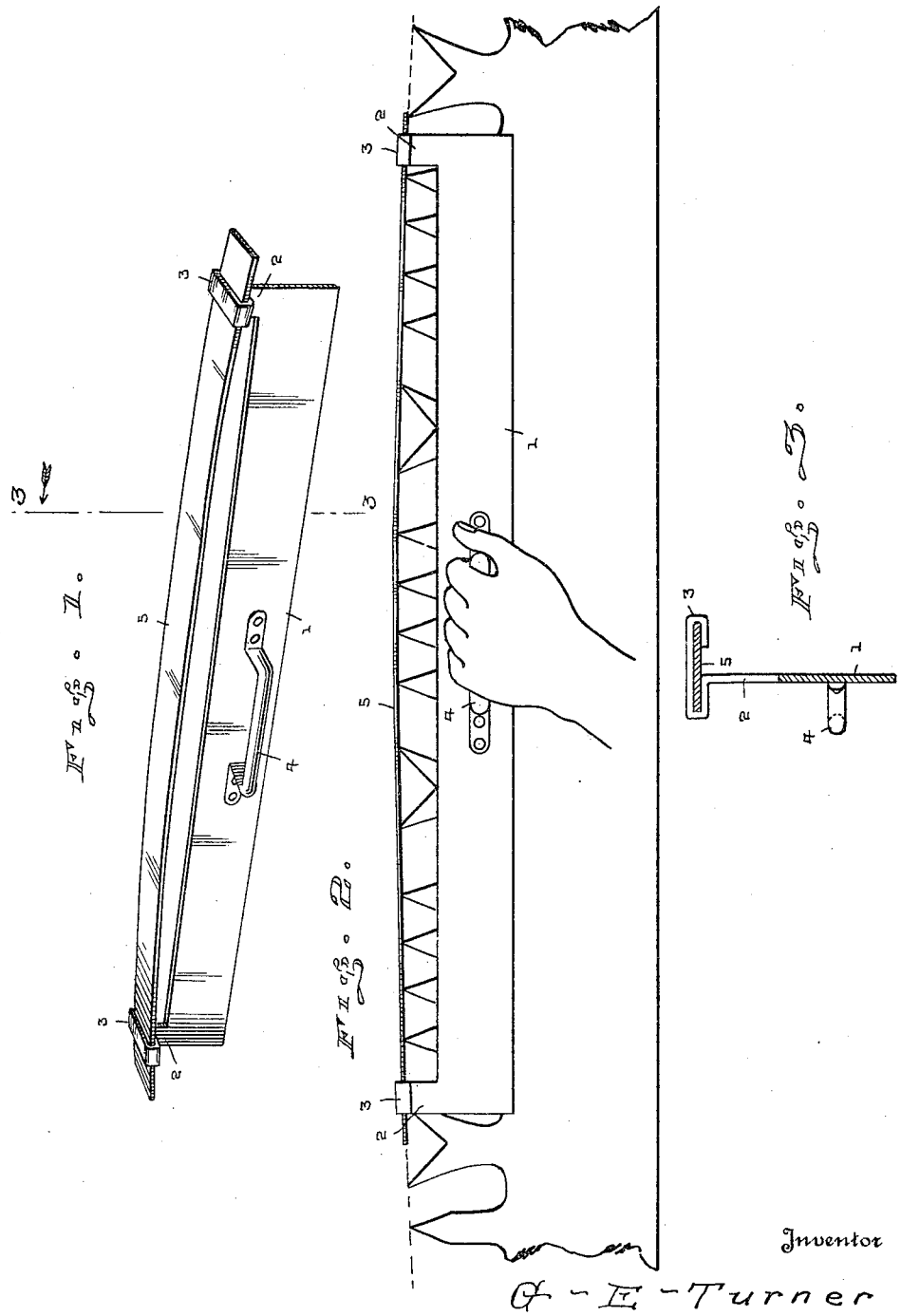
Inventor
G. E. Turner
By W. T. FitzGerald
Attorneys

UNITED STATES PATENT OFFICE.

GEORGE EDMOND TURNER, OF OLYMPIA, WASHINGTON.

SAW-TOOL.

1,272,153.     Specification of Letters Patent.      Patented July 9, 1918.

Application filed October 9, 1917. Serial No. 195,598.

*To all whom it may concern:*

Be it known that I, GEORGE EDMOND TURNER, a citizen of the United States, residing at Olympia, in the county of Thurston and State of Washington, have invented certain new and useful Improvements in Saw-Tools; and I do hereby declare the following to be a full, clear, and exact description of the invention, such as will enable others skilled in the art to which it appertains to make and use the same.

This invention relates to a new and useful saw tool, the primary object of the invention being to provide a tool of this character for determining and gaging those teeth of a saw which need dressing and setting to make them correspond to the remaining teeth and place their points in the same arc or line.

With these and other objects in view as will appear as the description proceeds the invention comprises the various novel features of construction, combination and arrangement of parts as will be more fully described hereinafter and afterward specifically claimed.

Referring to the drawings,

Figure 1 represents a perspective view of my novel saw tool.

Fig. 2 represents a side elevation of the tool operatively applied to the teeth of a saw, and Fig. 3 represents a vertical transverse sectional view taken on a plane indicated by the line 3—3 on Fig. 1.

In order that the construction and operation of the invention may be readily comprehended, I have illustrated an approved embodiment thereof in the accompanying drawings and will now proceed to fully describe the same, in connection with said drawings, in which 1 indicates a flat metal bar, the ends of which are provided with flat upstanding arms 2 disposed in the same vertical plane with the bar. Each of the arms 2 is bent to form a loop 3 disposed transversely in a plane at right angles to said bar, and each arm is arranged to support each loop at a point intermediate its ends. The bar, arms and loops are preferably formed from a single blank sheet of material, but if desirable may be made separately and suitably connected.

The bar 1 has a suitable handle 4 attached to one side thereof intermediate its ends and in this instance the handle is substantially U-shaped.

5 indicates a hardened resilient flat steel bar slidably disposed through the loops 3 and which is of a width to snugly fit within the loops to maintain it in a plane at right angles to the body of the bar 1. While the steel bar 5 is slidably mounted in the loops 3 it is of course to be understood that it fits so snugly within the loops as to prevent casual disengagement therefrom in handling the tool.

In the use of the tool and to determine which of the saw teeth need jointing to make them all alike, or to correspond to each other, the handle 4 is grasped and the tool positioned with respect to the saw so that the bar 1 rests flat against the side of the saw and the flat hardened steel bar 5 rests upon the points of the saw teeth. By looking beneath the flat steel bar 5, those teeth which are touching its under side can be readily seen and thus indicate which of them must be jointed to make them all alike or uniform with respect to each other. The flat steel bar 5 will also afford a gage to enable all the points of the saw teeth to be accurately set in the same arc or line.

When the tool has been arranged in operative position and it is found that some of the teeth extend only slightly beyond the ends of the others, the steel bar 5 may be tapped gently on top to compress or shorten them so that the points of all the teeth will rest in the same arc or line. Ordinarily in jointing the teeth of a saw all of them are gone over from one end of the saw to the other but by the use of my tool considerable labor and time is saved as well as useless jointing of some of the saw teeth, as with my tool those teeth which need jointing can be immediately determined without going over all of the teeth to make sure that they are properly jointed.

I claim:

1. A saw tool comprising a flat bar, arms extending parallel and in the same direction from the ends of said bar and in the same plane therewith, loops carried by said arms, and a flat resilient steel bar slidably disposed through said loops.

2. A saw tool comprising a flat bar, flat integral arms extending from the ends of said bar in the same plane therewith, loops integral with said arms and disposed transversely of said bar, a handle for said flat bar, and a flat resilient steel bar slidably disposed through said loops.

In testimony whereof I have signed my name to this specification in the presence of two subscribing witnesses.

GEORGE EDMOND TURNER.

Witnesses:
J. T. OTIS,
VIRGIL OTIS.

Copies of this patent may be obtained for five cents each, by addressing the "Commissioner of Patents, Washington, D. C."